United States Patent
Takanashi

[15] 3,662,955
[45] May 16, 1972

[54] LENGTH OF WATERING HOSE FOR CULTIVATING PLANTS

[72] Inventor: Michinobu Takanashi, 5, 9-banchi, 2-chome Sakae-cho, Higashi, Murayama-shi, Tokyo-to, Japan

[22] Filed: Mar. 10, 1970

[21] Appl. No.: 18,163

[30] Foreign Application Priority Data

Nov. 18, 1969 Japan.................................44/108921
June 6, 1969 Japan...................................44/52427

[52] U.S. Cl..............................239/145, 239/269, 239/450, 239/568
[51] Int. Cl.........................................................A01g 27/00
[58] Field of Search..........................239/145, 269, 450, 568

[56] References Cited

UNITED STATES PATENTS 2,771,320  11/1956  Korwin..............................239/450 X
2,730,404  1/1956   Meisinger et al. ......................239/269
2,750,232  6/1956   Szantay et al.......................239/269 X
3,080,124  3/1963   Rathmann..............................239/450

*Primary Examiner*—Lloyd L. King
*Attorney*—Holman, Glascock, Downing & Seebold

[57] ABSTRACT

A length of hose made of a flexible and weather-proof material having high elasticity e.g., a suitable synthetic resin, or plastics or a co-polymer of ethylene vinyl acetate resin, having a plurality of incisions formed in the wall of the hose from inside to outside at proper portion thereof, and comprising a strengthening means such as a longitudinal cross shaped press-back means made of polyethylene or a co-polymer of acrylo nitrile ethylene or ethylene vinyl acetate inserted into the hose; the hose may instead be provided with longitudinal stiffening ribs on the surface thereof; longer lengths of the hose may be formed by joining shorter lengths of the hose by means of adaptors.

2 Claims, 8 Drawing Figures

Patented May 16, 1972
3,662,955
2 Sheets-Sheet 1
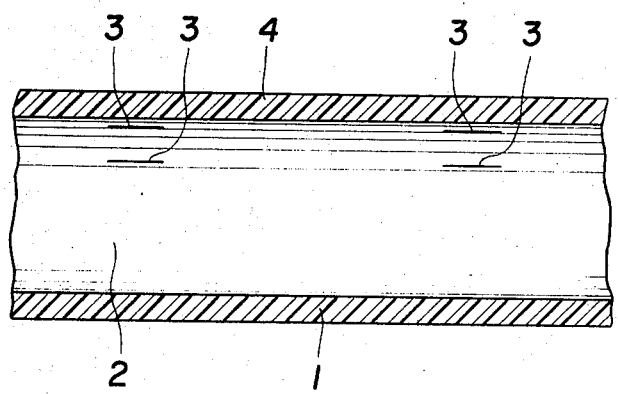
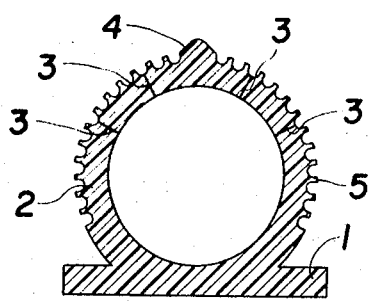
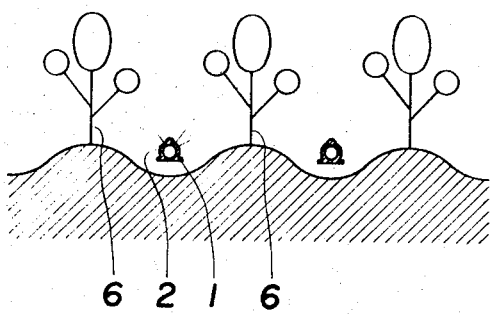
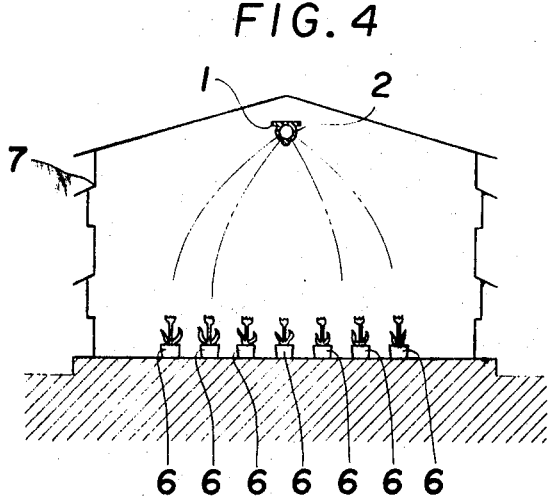
INVENTOR
MICHINOBU TAKANASHI
BY Holman, Glascock, Downing & Seebold
ATTORNEYS

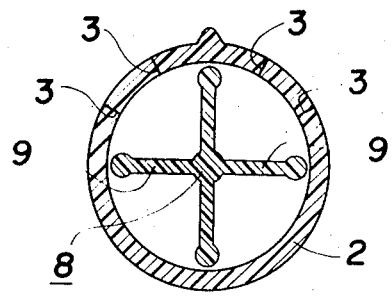
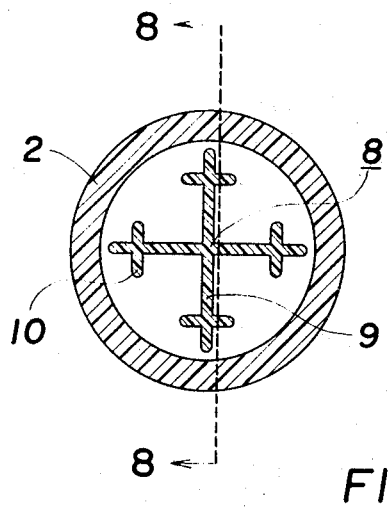
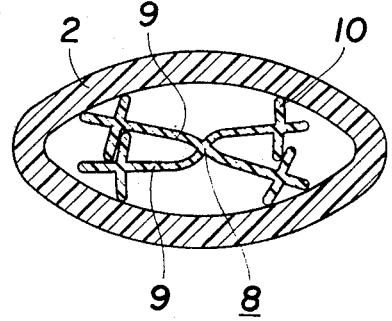
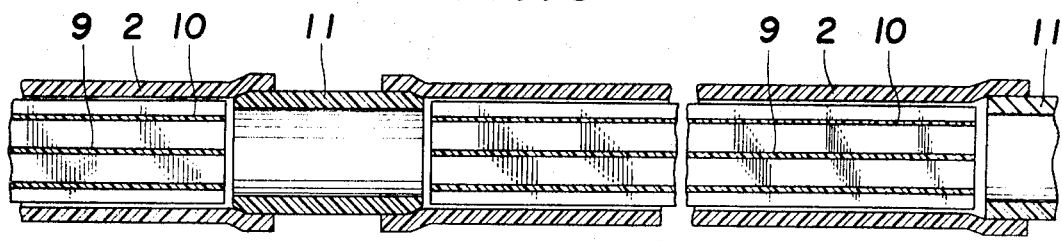

3,662,955

LENGTH OF WATERING HOSE FOR CULTIVATING PLANTS

BACKGROUND OF THE INVENTION

1. Field of the Invention

The present invention relates to a length of hose made of flexible and weather proof material to sprinkle plants with water or to supply fertilizer solution for cultivation.

2. Description of the Prior Art

When cultivating plants in fields or in a green house, such means as a splinkler or a watering pot having perforations, is known to be used.

However, it not only takes much time, but also, has had such drawbacks as uneven watering on the plants.

Also known are apertured hoses which however tend to have blocked holes in the course of usage because of mud and dirt consolidating in the apertures.

The present invention is intended to eliminate such trouble and drawbacks.

SUMMARY OF THE INVENTION

The object of the present invention is to provide an improved hose means which will eliminate the defects mentioned above, and will water evenly over the plants in an easy way.

The length of hose 2 of the present invention is made of a weather-proof and flexible material having high elasticity such as a suitable synthetic resin, plastics or a co-polymer of ethylene vinyl acetate resin; the hose has a plurality of incisions formed through the hose wall from inside to outside, for the purpose of sprinkle plants with water through the incisions which resiliently open under internal water pressure to sprinkle water out of the hose. The opening formed varies according to the size of the cut 3 and the degree of elasticity of the material and the angle of the cut formed in the hose.

Water can be sprinkled to extend as far as desired with an increased water pressure.

The cuts 3 opened by a water pressure in the hose are closed by releasing the pressure so that the water that remains in the hose 2 will not leak through the closed cuts 3 and dirt or mud will not enter the hose 2 when it is used on the ground as shown in FIG. 3.

But, if sand or mud were mixed with the remaining water in the hose, it will be pushed forward by giving an increased water pressure through the opened cuts 3 so that they will not be clogged up.

It is very easy to water all over the plants in the fields or in a green house evenly without any trouble by using the hose of the present invention.

For the purpose of preventing the hose 2 from collapsing a longitudinal press-back means 8 the cross-section of which is a cross shape as shown in FIG. 5, and made of polyethylene or a co-polymer of acrylo nitrile ethylene or ethylene vinyl acetate is inserted into the hose.

To connect lengths of hose to farm longer lengths as desired, an adapter 11 is employed which can also prevent the press back means from being pushed out of the hose by water pressure, as shown in FIG. 8.

As the hose of the present invention is manufactured by a certain length, it is not only very convenient to use or to sell, but also, it is resilient so that it can spring back against being bent or twisted or even against thermal deformations.

The length of flexible hose 2 and the press-back means 8 can be mass manufactured by molding, so that the cost of production is very low.

BRIEF DESCRIPTION OF THE DRAWING

FIG. 1 is a side vertical cross-sectional view longitudinally taken through a hose with incisions.

FIG. 2 is a vertical cross-sectional view taken through the central portion of one embodiment of the invention.

FIG. 3 is an elevational view of the embodiment of FIG. 2. being used in fields for watering.

FIG. 4 is an elevational view of the device of FIG. 2 being used in a green house.

FIG. 5 is a vertical cross-sectional view taken through the central portion of another embodiment of the invention including a press-back means.

FIG. 6 is a vertical cross-sectional view of a further embodiment similar to that of FIG. 5.

FIG. 7 is a vertical cross-sectional view of the hose being depressed.

FIG. 8 is a side vertical cross-sectional view longitudinally taken through the device connected with each other by an adapter.

DETAILED DESCRIPTION

A length of hose 2 of the invention, as shown in FIG. 1, is mounted on a support bed 1 which is integral with the hose 2.

A plurality of incisions 3 are formed through the wall of the hose. On the top of hose is formed a projected lone longitudinally for indication and around the surface of the hose are formed a plurality of grooves and projections 5.

When the length of hose is used, it is put on the ground between plant rows 6 as shown in FIG. 3, and when it is used in a green house 7, it can be fixed below the ceiling as shown in FIG. 4. The length of hose is connected to a water supplying pipe through a water supplying valve and when the valve is opened, the cuts 3 of the hose are opened by a water pressure and through the cuts 3 water is supplied evenly all over the plants 6.

When the length of hose 2 is used under the ground for the purposes distributing a liquid fertilizer, a longitudinal press-back means 8 having a cross section of a cross is provided with a pair of wings 9 crossed and extending radially outwardly. Fluid fertilizer is supplied through the opened cuts 3 being forced out of the length of hose 2 as by water pressure, to the plants 6.

The press-back means 8 is made of flexible material such as suitable synthetic resin, polyethylene or acrylo nitrile ethylene or ethylene vinyl acetate and formed longitudinally almost as long as the length of a length of hose 2.

An adapter 11 having a little larger diameter than that of the inside of the hose, is inserted into hoses at its both ends to connect them. The adapter 11 prevents the press-back means from coming out of the hose by being forced by water pressure.

As shown in FIG 7, when a heavy thing happens to mount on the hose 2 and depresses it, the press-back means 8, 9 not collapsing fully prevents the water flowing through the hose from stopping, owing to its elasticity. In case the hose 2 is twisted, the twisted portion does not concentrate upon a limited portion but separates and spreads upon the surface of the hose uniformly owing to the press-back means 8, and the hose will never break, whereas a hose having no press-back means may be broken.

Further, even if the passage for water becomes narrow by an increased twisting, the press back means will let water flow without stopping.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. In a flexible hose made of a resilient material and of the type provided with incisions in the tube wall which are leak-proof when the hose is not in use but resiliently open up when a liquid under pressure is pumped therethrough to give out jets of the liquid, the improvement being in that the hose comprises stiffening means disposed longitudinally of the hose, said stiffening means comprising elongated press-back means inserted into the hose, extending substantially the length of the hose, the press-back means including in cross-section radially projecting members so as to provide mechanical strength to the hose, and to resist the hose being fully collapsed under a load so as to maintain continuity of supply of the liquid.

2. The hose as claimed in claim 1, which further includes interconnecting tubular means adapted to be inserted into the ends of hose sections to connect serially shorter lengths of the hose to form a longer length thereof, and wherein each said tubular means is adapted to prevent an adjacent press-back means from being conveyed away by pressure liquid in the hose.

* * * * *